(12) United States Patent
Marraffa

(10) Patent No.: US 7,323,271 B2
(45) Date of Patent: Jan. 29, 2008

(54) FRONT ACCESS BATTERY TRAY APPARATUS AND SYSTEM

(75) Inventor: Andrew Marraffa, Exton, PA (US)

(73) Assignee: Kim Manufacturing Company, Downingtown, PA (US)

( * ) Notice: Subject to any disclaimer, the term of this patent is extended or adjusted under 35 U.S.C. 154(b) by 360 days.

(21) Appl. No.: 10/926,859

(22) Filed: Aug. 26, 2004

(65) Prior Publication Data

US 2005/0058891 A1    Mar. 17, 2005

Related U.S. Application Data

(60) Provisional application No. 60/498,235, filed on Aug. 27, 2003.

(51) Int. Cl.
*H01M 2/00* (2006.01)
(52) U.S. Cl. .................. 429/99; 429/100
(58) Field of Classification Search .......... 429/99, 429/100, 97, 163; 277/13.1
See application file for complete search history.

(56) References Cited

U.S. PATENT DOCUMENTS

| | | | | |
|---|---|---|---|---|
| 5,890,606 A | * | 4/1999 | Kuipers | 211/186 |
| 2002/0015880 A1 | * | 2/2002 | Heimer | 429/97 |
| 2005/0084748 A1 | * | 4/2005 | Miller et al. | 429/99 |

* cited by examiner

*Primary Examiner*—Patrick Joseph Ryan
*Assistant Examiner*—Monique Wills
(74) *Attorney, Agent, or Firm*—Eugene E. Renz, Jr.

(57) ABSTRACT

A front access battery module for supporting batteries during seismic stress, comprising a pair of spaced side panels, a rear panel spanning the side panels and connected thereto at opposing side edges, a shelf forming a base for supporting batteries and means for securing the module to a support structure and fastening means for securing modules together to form a multi-tier battery rack system wherein the anchoring means and connecting means are accessible from the open front access end of the module.

6 Claims, 24 Drawing Sheets

TOP VIEW

BOTTOM VIEW

TOP VIEW

BOTTOM VIEW

US 7,323,271 B2

FRONT ACCESS BATTERY TRAY APPARATUS AND SYSTEM

This application claims the benefit of Provisional Application Ser. No. 60/498,235 entitled, FRONT ACCESS BATTERY TRAY, filed Aug. 27, 2003.

FIELD OF THE INVENTION

The present invention relates to a modular tray system and apparatus for supporting batteries designed to survive seismic forces during earth tremors and the like.

BACKGROUND OF THE INVENTION

There is a need particularly in the telecommunications industries for back-up power source to maintain operations when the primary source shuts down. These systems generally comprise a plurality of valve regulated lead acid batteries (VRLA), generally of a two (2) volt size which are typically connected in series in various numbers such as 24 batteries to provide a 48 volt system. Typically, these batteries are supported in battery rack systems of the type shown, for example, in U.S. Pat. No. 6,719,150 issued Apr. 13, 2004 entitled BATTERY RACK AND SYSTEM and owned by the Assignee of the present invention. This prior system is generally effective for the purposes intended. However, there are some installations where the space requirements for the racks are tight and where assembly and mounting of the rack system in these confined areas is difficult and time consuming.

SUMMARY OF THE INVENTION

The modular tray system and apparatus of the present invention are characterized by novel features of construction and arrangement providing for easy and quick assembly of a multi-tiered tray assembly in a tight space wherein the components of the assembly can be assembled and bolted in place through the front of the module. Broadly, the module comprises a pair of identical interchangeable side panels, a J shaped rear panel having a configuration to accommodate battery cables, a shelf configured to provide a rigid base for the batteries and various corner stiffener channel members creating vertical columns for structural stiffness and a top corner stiffener angle to strengthen tray to tray bolting joints. The various components have strategically located slots and holes to enhance optimum air flow for passive convection cooling.

With the foregoing in mind, it is an object of the present invention to provide an improved modular tray system characterized by novel features of construction and arrangement providing certain structural advantages over the prior art and systems discussed above.

A further object of the present invention is to provide a modular battery tray system wherein the components comprising the modules are designed in such a fashion to facilitate assembly of the components and installation at a site utilizing only the front access opening of the module to thereby permit assembly and installation even in small and confined areas.

A still further object of the present invention is to provide a novel modular tray assembly and system which includes novel relatively rigid components defining vertical strength and stability in the assembled relation which are easily accessible to secure the assembly on a concrete floor and the like.

Still another object of the present invention is to provide a novel combination of components including interchangeable and identical side panels and a back panel of J-shaped cross section which in the assembled relation ties the side panels together and supports the shelf forming the base on which the batteries are mounted.

A still further object of the present invention is to provide a modular battery tray system and apparatus including a novel arrangement for routing battery cables from front to back so that they may be connected utilizing only the open front end of the module as an access.

Still another object of the present invention is to provide a modular battery tray system and apparatus which meets the high, stringent seismic requirements for tray systems of this type prescribed by Telcordia Technologies.

BRIEF DESCRIPTION OF THE DRAWINGS

These and other objects of the present invention and the features and details of the operation and construction thereof are hereinafter more fully set forth with reference to the accompanying drawings wherein,.

DESCRIPTION OF THE PREFERRED EMBODIMENTS

Figure 1:
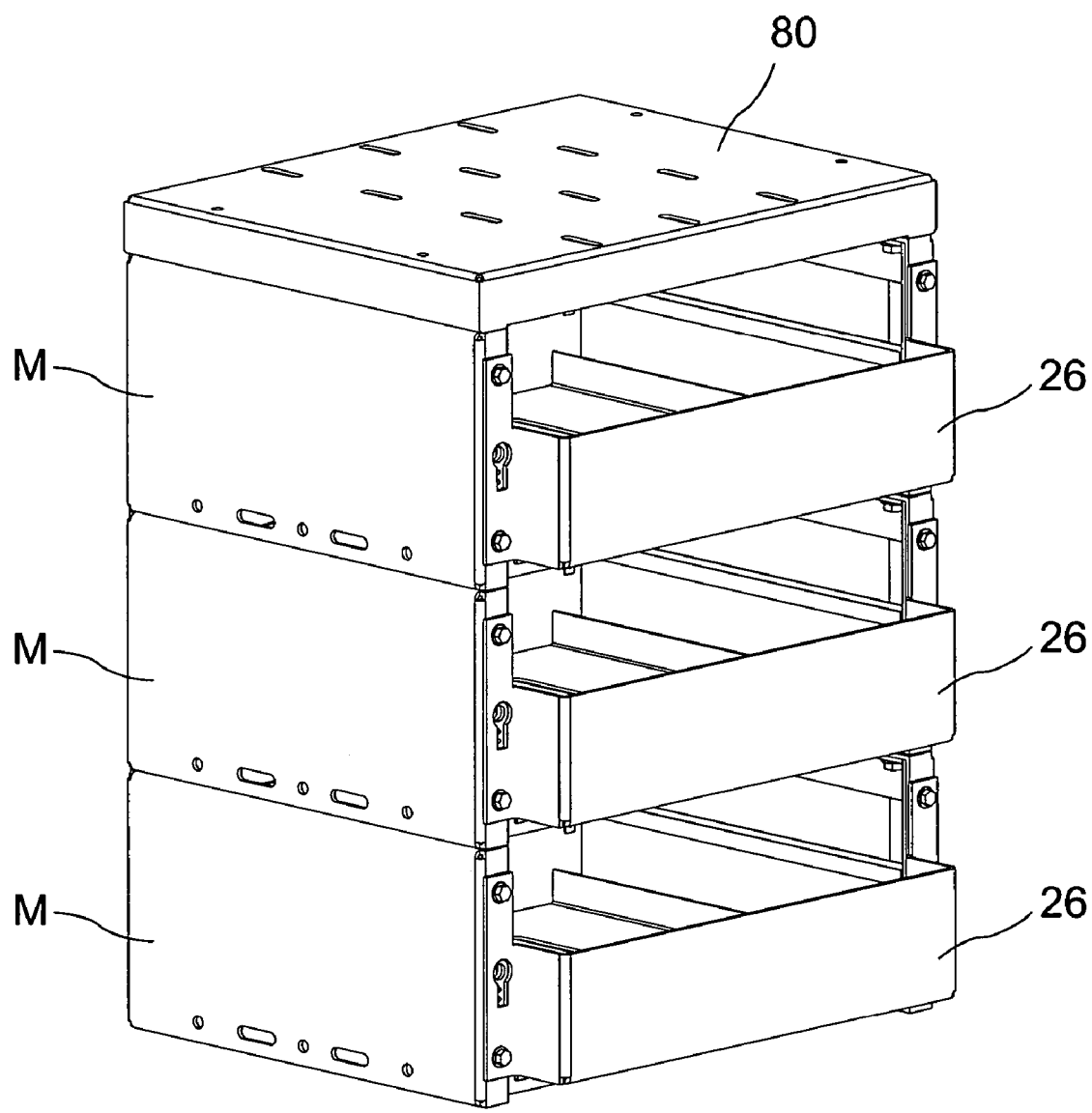
FIG. 1 is a perspective view of a front access battery tray system embodying the present invention wherein the system comprises three tiers or trays.
Figure 2:
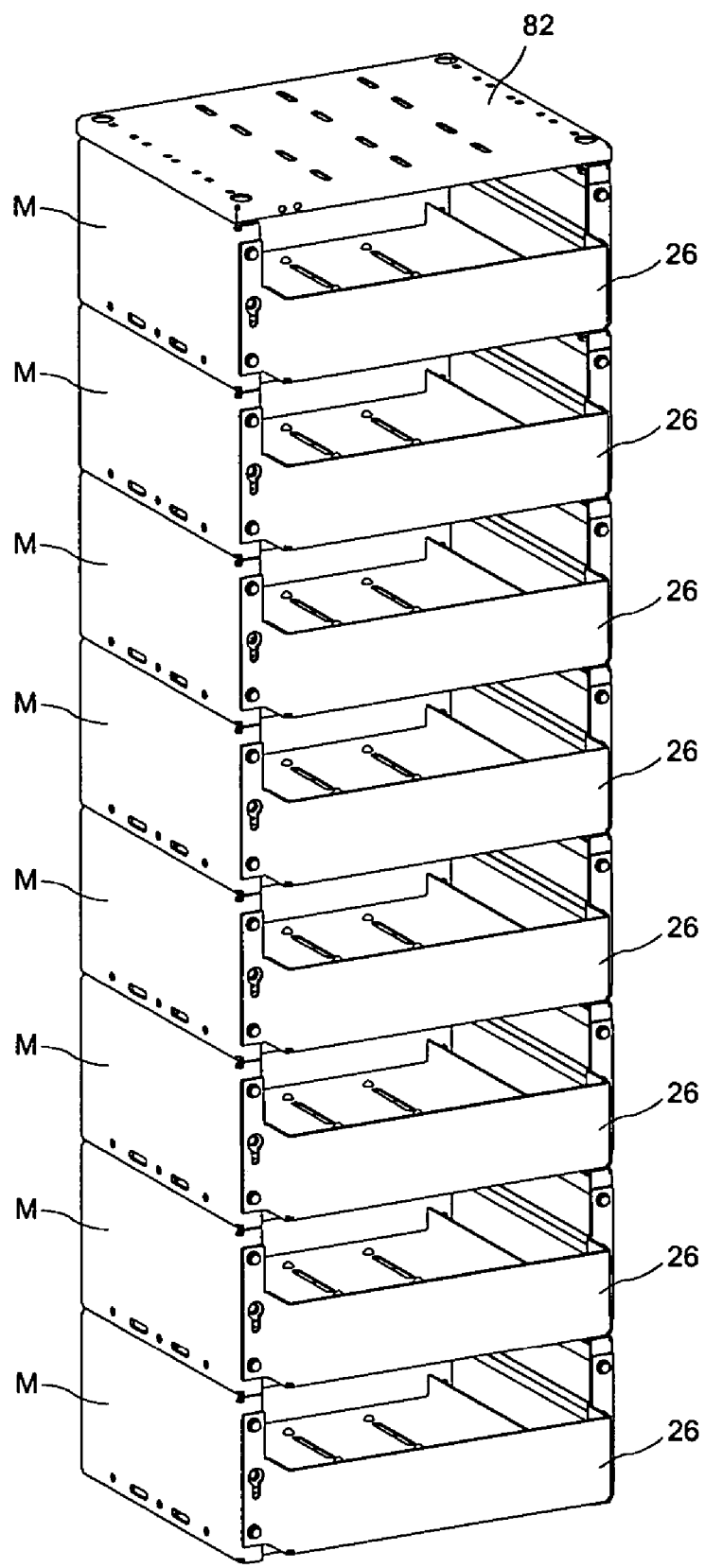
FIG. 2 is a perspective view of a front access battery tray system showing an eight (8) tier arrangement.
Figure 3:
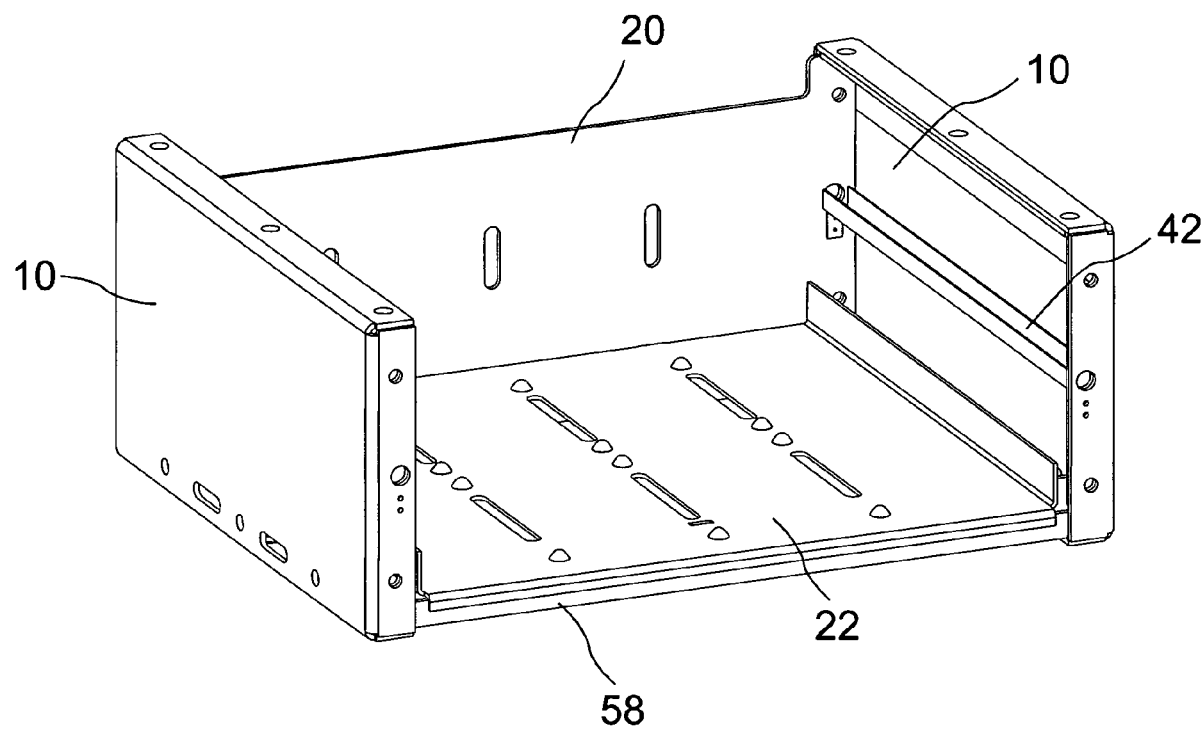
FIG. 3 is a perspective view of one of the trays or tiers.
Figure 4:
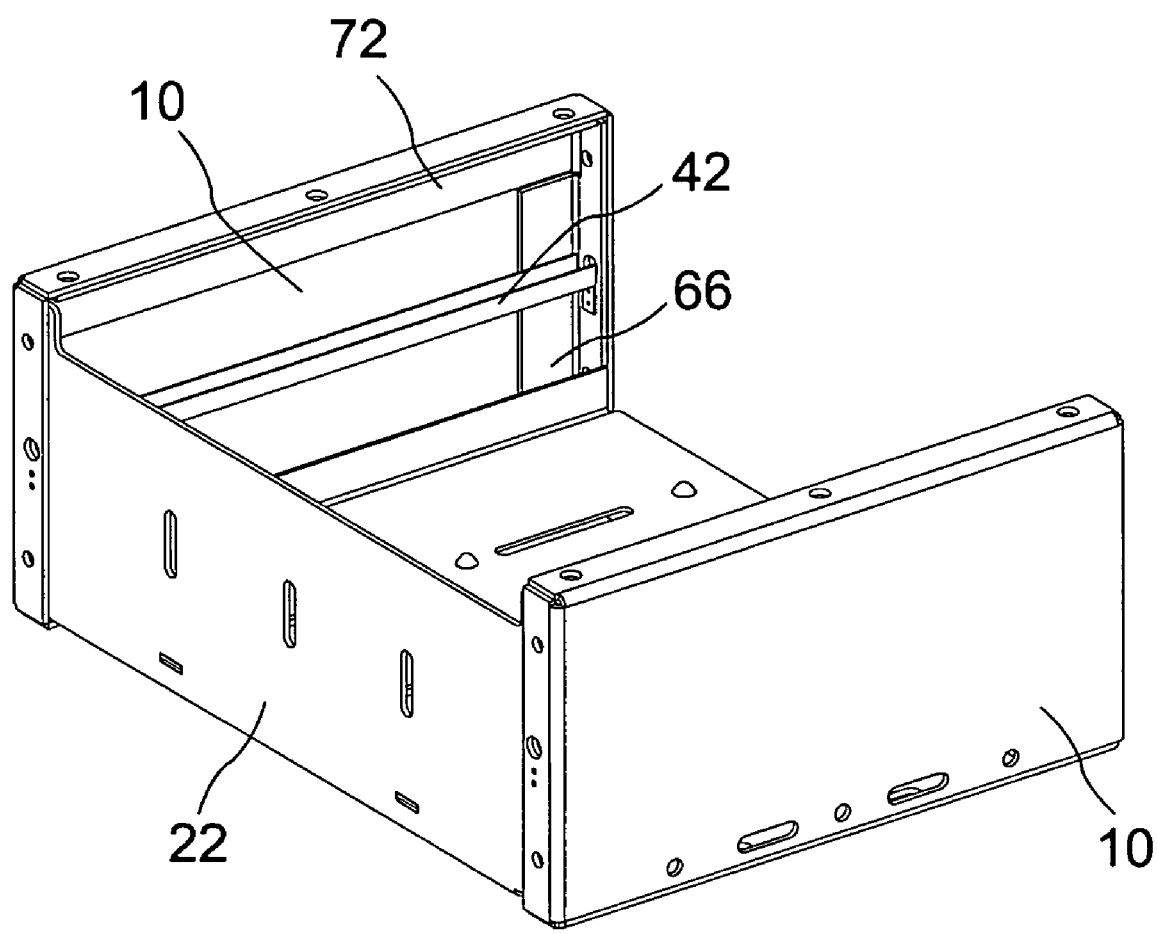
FIG. 4 is a perspective view of one of the trays or tiers as viewed from the end and rear panel.
Figure 5:
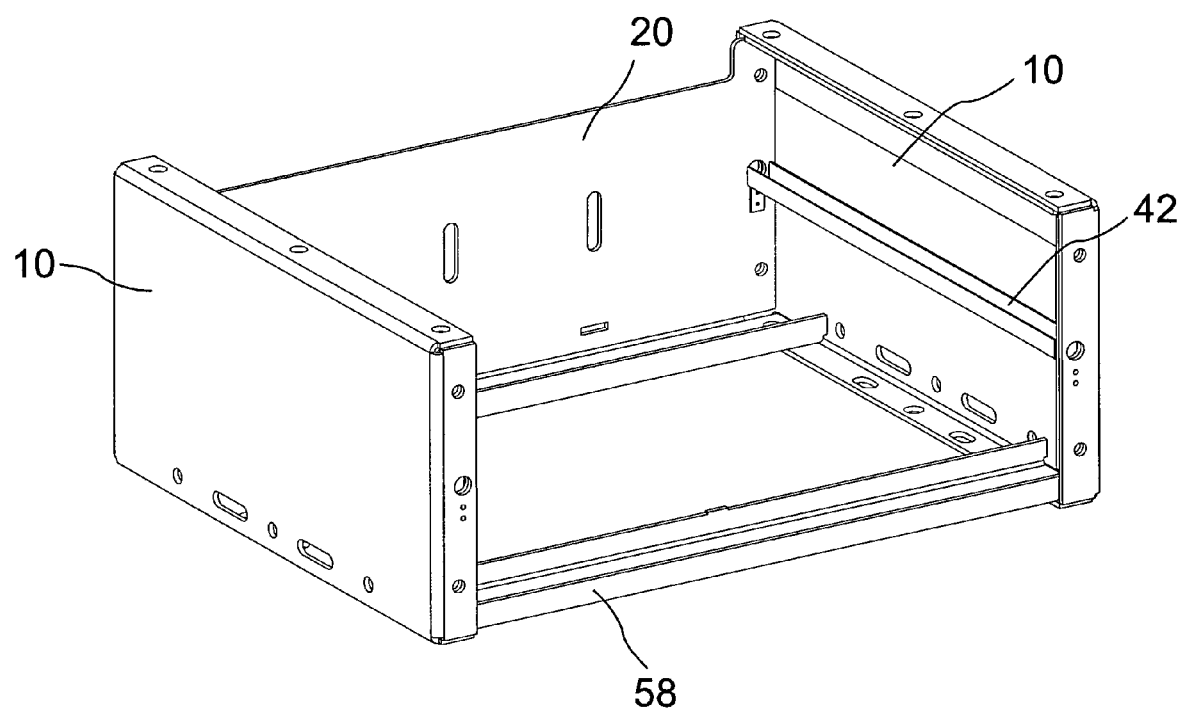
FIG. 5 is a perspective view as viewed from the front with the bottom panel or shelf removed.
Figure 6:
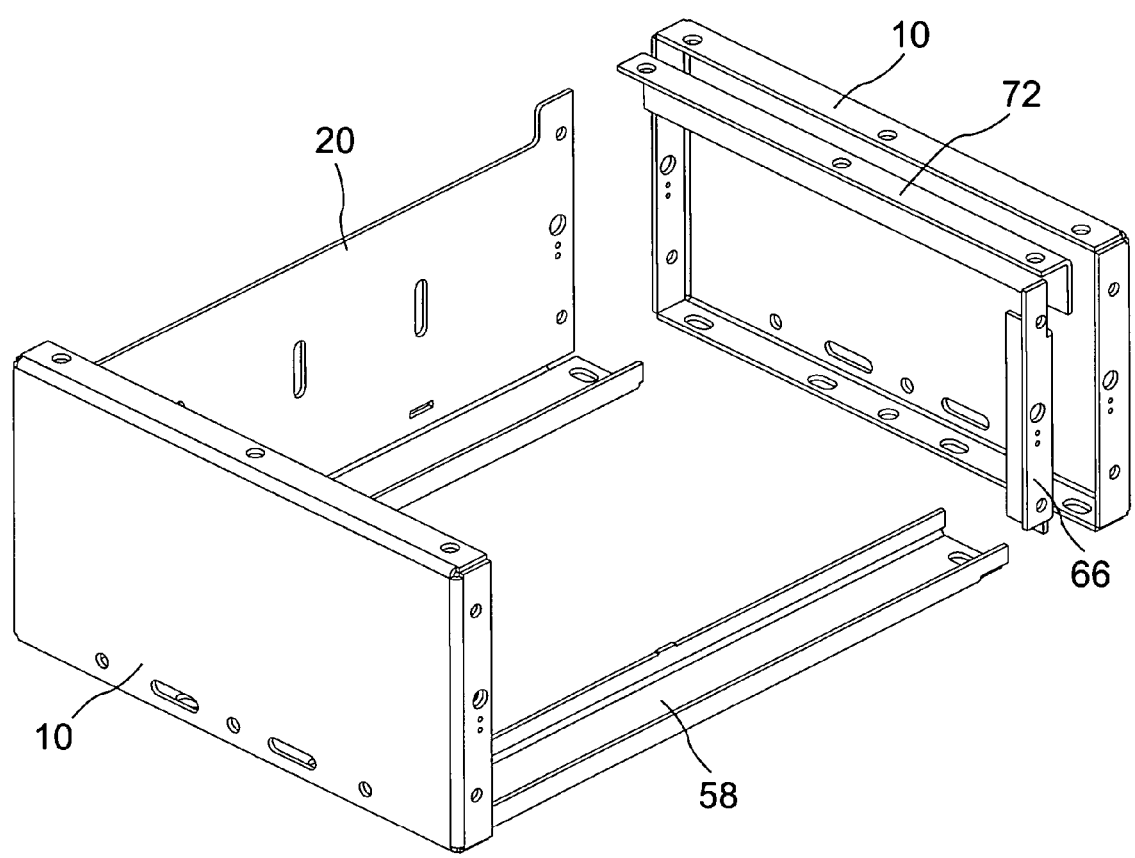
FIG. 6 is an exploded perspective view of the components comprising the tray including the rear panel and side panels.

Referring now to the drawings and particularly to FIGS. 1-2 thereof, there are shown multi-tier battery tray systems in accordance with the present invention comprised of a plurality of modules M which are generally similar in terms of components and arrangement which may be stacked and secured to one another in the manner shown.

Figure 11:
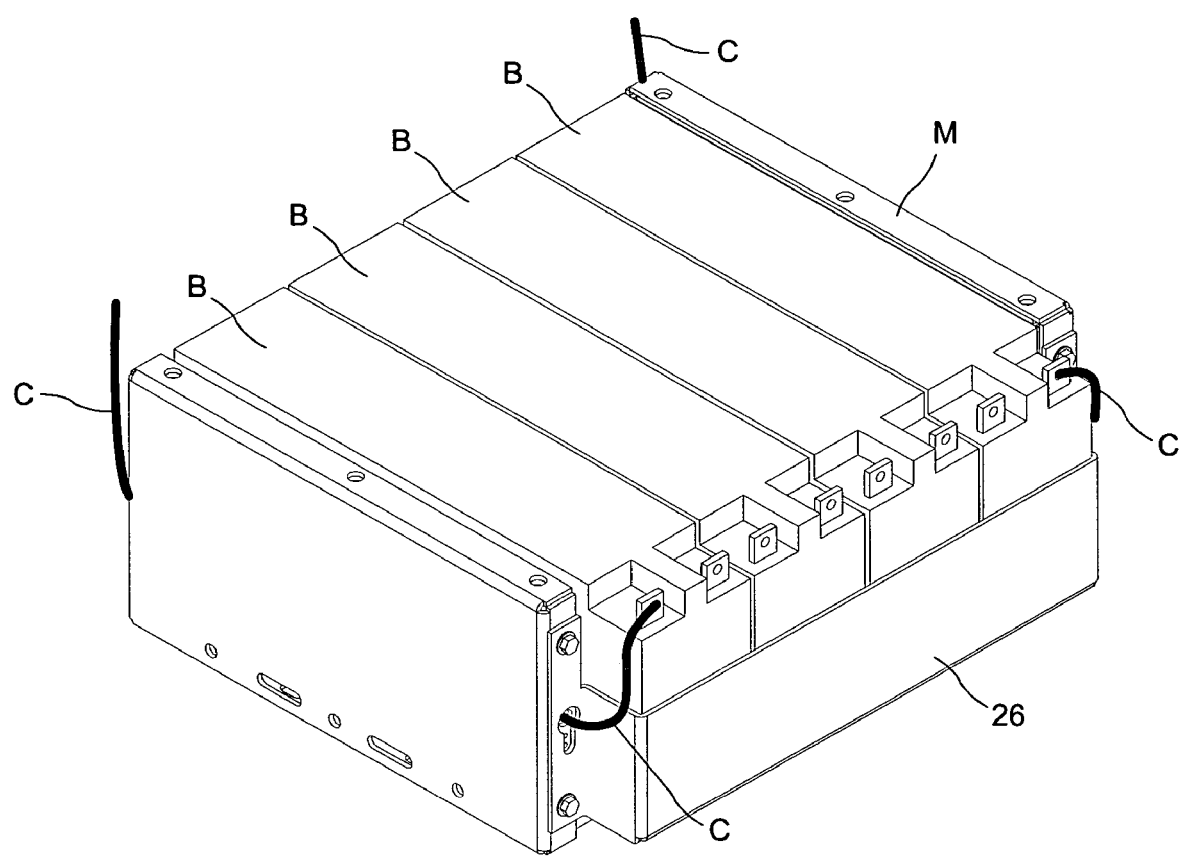
FIG. 11 is a perspective view showing the batteries mounted and connected in a battery tray in accordance with the present invention.
Figure 12:
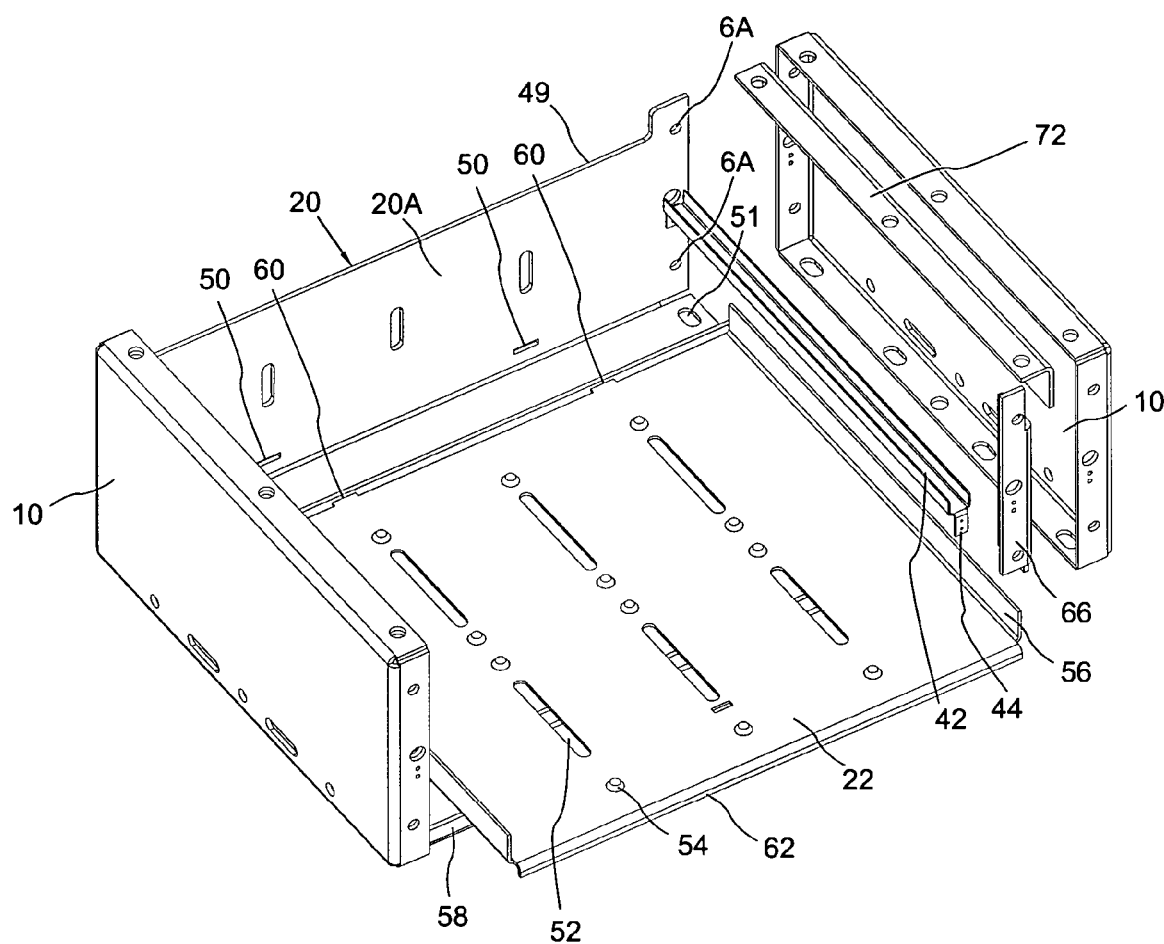
FIG. 12 is an exploded perspective view of the components comprising a battery tray in accordance with the present invention.
Figure 13:
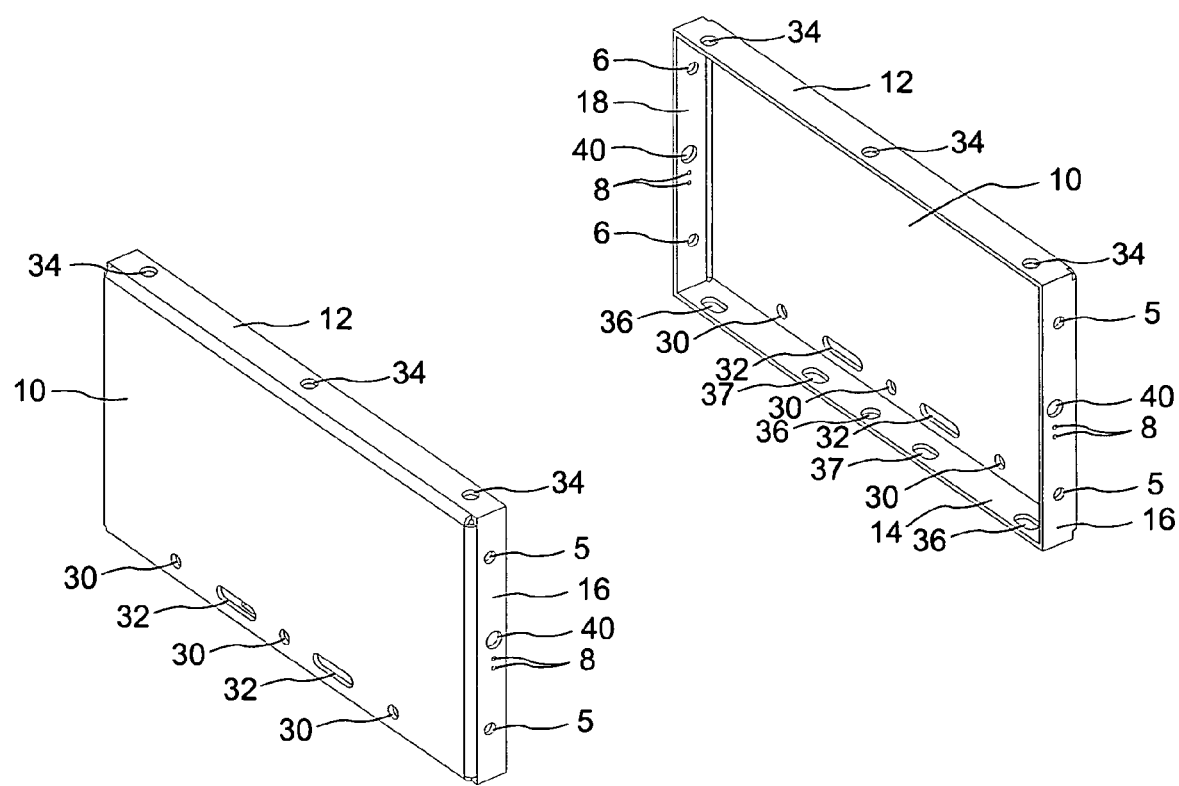
FIG. 13 are perspective views of the identical left and right side panels of the battery tray of the present invention.

Considering first the broad components of a module M, and with specific reference to FIGS. 12 and 13, each module M comprises left and right side panels 10, 10 of identical construction and thus the parts thereof bear identical reference numerals. Each side panel 10 has an inwardly directed top and bottom flange 12 and 14 and front and rear flanges 16 and 18 connecting the top and bottom flanges. The tray module M has a back or rear panel 20 spanning the side panels 10. A base or shelf 22 for supporting batteries B is mounted on a series of cross channels extending between the side panels 10. The shelf 22 has means defining spaces or rows for the batteries B. A retainer 26 holds the batteries B in place in the manner shown in FIG. 11 to complete the assembly. Cables C connected to the positive and negative terminals are routed through the tray module M in the manner shown in FIG. 11 and extend upwardly through a rear cable bracket 29 to connect to a terminal (see FIG. 10).

Figure 1A:
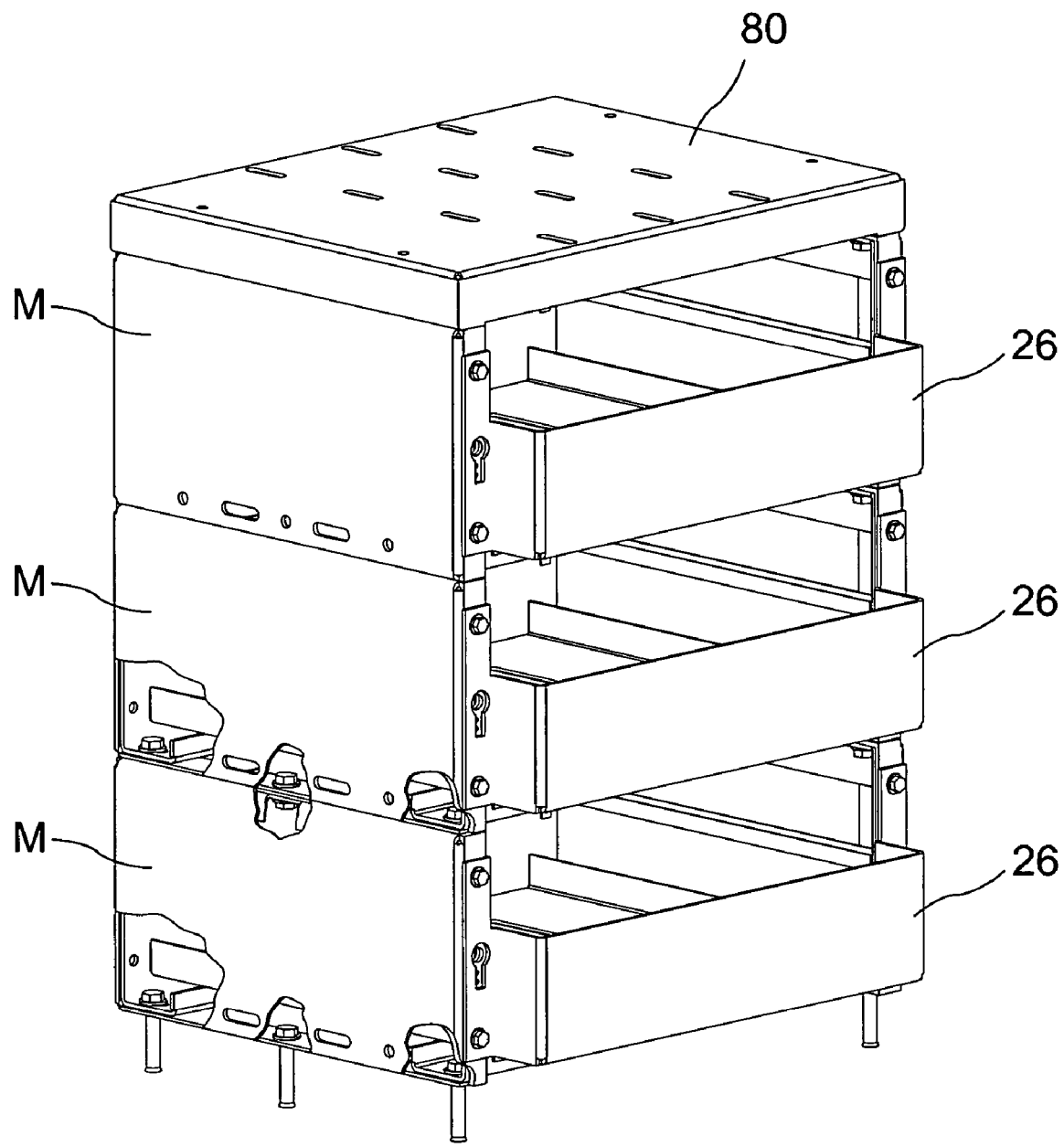
FIG. 1a is a perspective view similar to FIG. 1 with portions of the side panel removed to show the anchor bolts and bolts securing adjacent modules.
Figure 20A:
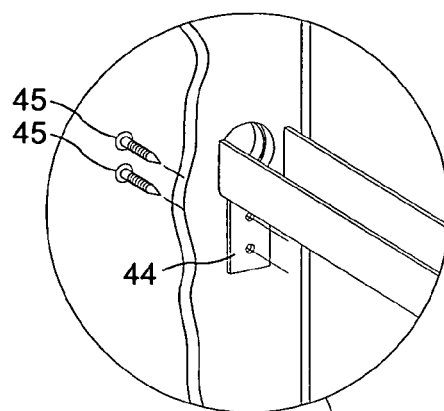
FIG. 20a is an enlarged view of the portion circled in FIG. 20 showing the means for connecting the cable channel to the rear panel.
Figure 20:
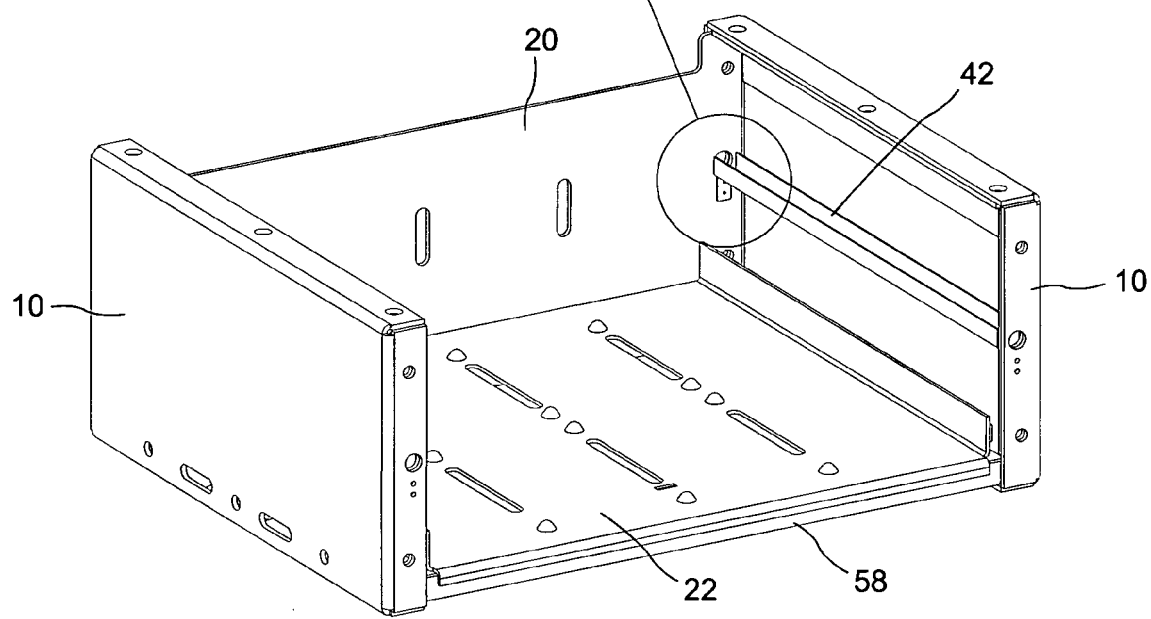
FIG. 20 is a perspective view of the tray.

Considering now more specifically, the components of the modular tray M, the face of the side panel 10 adjacent the bottom flange 14 has a series of spaced ventilation holes 30 and elongated oval shaped slots 32. The top flange 12 has a series of bolt holes 34 in the present instance three (3) and the bottom flange has aligned bolt holes 36 for securing and mounting the trays together to form a multi-tier tray system (see FIG. 1a). Note that the bolt holes 36 in the lower flange are oversized, i.e. oval shaped to provide a greater margin for anchoring purposes when mounting a stack of modules to the support surface such as a concrete floor. An alternate anchoring hole 37 is provided in the bottom flange to accommodate anchoring to a support surface having an anchoring rail. Side flanges 16 and 18 have aligned holes 40 for mounting the cable channel 42 in the manner shown in FIGS. 20 and 20a. Note the cable channel 42 has depending tangs 44 at opposite ends to accommodate securing it in place to the side flanges 16, 18 of the side panels 10 via screws 45 engaging in holes 8. The side flanges also have holes 5 and 6, adjacent the corners, the holes 6 accommodating bolts for securing the rear cable bracket 29 (See FIG. 10). The holes 5 are for mounting the retainer 26, 27. As noted above, the side panels 10 are identical in construction and configuration which provides economies in manufacturing and simplicity of assembly and installation.

Figure 14:
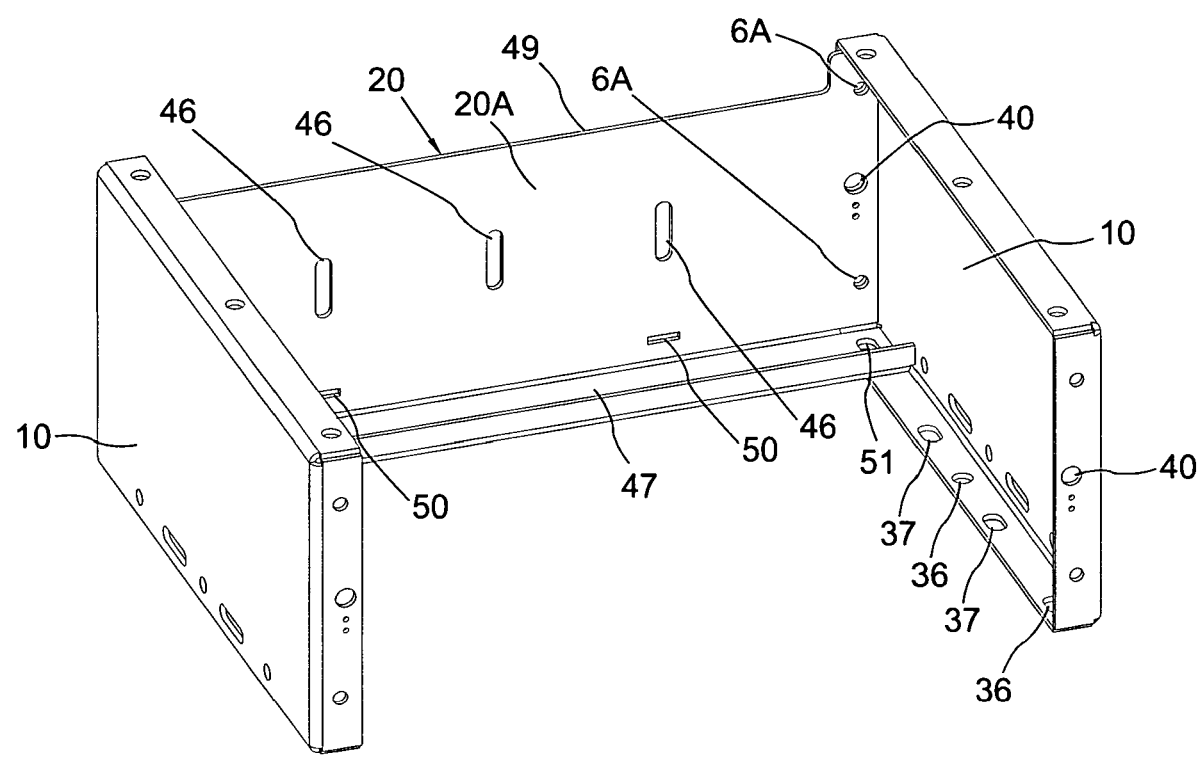
FIG. 14 is a partially assembled view showing the left and right side panels and the rear panel spanning the left and right side panels.

The rear panel 20 as best illustrated in FIG. 14 is of J shaped cross section and is secured by a weldment to the side panels to tie them together. The generally rectangular rear panel 20a nests in the side panels in the manner shown and has complementary holes 6a matching those in the rear connecting flange 18 of the side panels 10. The leg of the J also has a hole 51 to match one of the anchor holes 36 in the bottom flange 14. The upstanding portion of the rear panel is cut back across its top edge to define an opening 49 to provide access to the back of the module M and ventilation. A series of slotted ventilation holes 46 are formed in the rectangular portion 20a. A pair of transversely slotted holes 50 receive locating tabs 60 of the shelf in a manner described in more detail hereafter.

Figure 19:
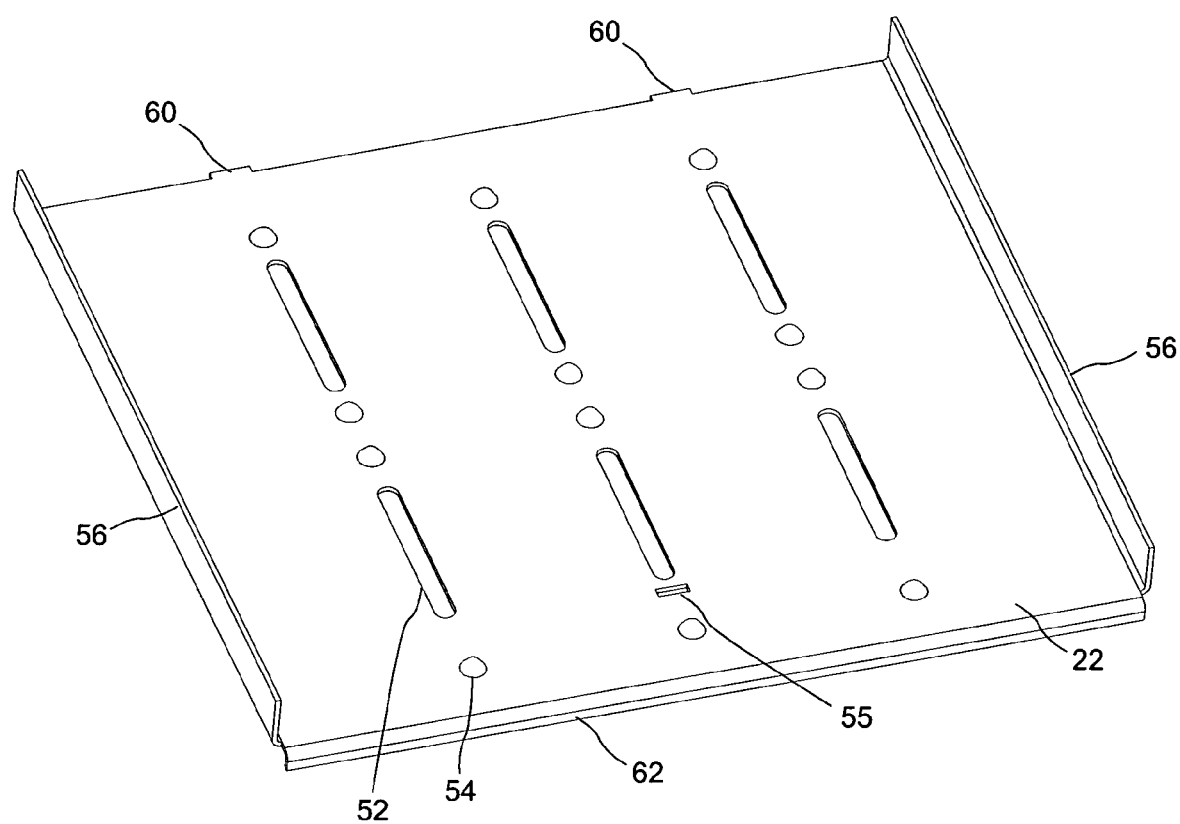
FIG. 19 is a perspective view of the battery shelf.

Considering now the shelf 22, which is best illustrated in FIGS. 12 and 19, the shelf is of generally rectangular configuration and has a series of battery rows or zones defined by transversely extending, alternating rows of spaced slots 52 and a series of upwardly projecting dimples 54. The dimples 54 space the rows of batteries leaving the slots 52 open for airflow to enhance battery performance. The shelf 22 has a pair of laterally spaced upstanding side flanges 56 to restrain the batteries B in a side to side direction. The front lip 62 of the shelf 22 depends from the front edge to engage over laterally extending u-shaped front support channel 58. The back edge of the shelf 22 has a pair of spaced tabs 60 which register with and engage in slots 50 to further rigidify the structure and prevent bowing or sagging of the shelf 22. The ventilation slots 52 provide even vertical airflow for passive convection cooling. The dimples 54 locate the batteries laterally on the shelf and help insertion of the batteries from the open front end of the module M. The shelf 22 has a slot 55 to receive tab 59 projecting upwardly from front support channel 58 to center the shelf properly and rigidify the structure.

The tray module M of the present invention is characterized by novel features of construction arrangement including essentially doubling the material thickness at predetermined corner locations to create structural columns. Thus, an elongated generally rectangular front corner stiffener 66 is welded to the side panel 10 adjacent the front connecting flange 16 creating the vertical column for structural stiffness which engages between the flanges 68 and 70 of the front u-shaped channel 58. The stiffener 66 has a series of holes complementing the holes in the front connecting flange 16. Further, an elongated angle brace 72 having complementary holes to the top flange 14 of the side panel is welded interiorly thereof. As noted previously, the rear panel 20 seats inside the front and rear connecting flanges 16 and 18 to provide vertical column strength at this corner.

The modules M described above may be manufactured and are assembled or assembled and formed into multi-tier tray systems at the site.

Summarizing the features of the modular battery tray system of the present invention, once the modules are pre-wired, no rear access is required and building a multi-tier tray system can be completely through the front access opening. Thus, the anchor holes and the bolt holes for stacking modules M are completely accessible from the front of the module M. The particular configuration and arrangement of the components of the module M such as the J-shaped channel which ties the side panels together and supports the shelf and the front corner stiffeners create a vertical column for structural stiffness and the top corner stiffener strengthen tray to tray bolting joints. Additionally, the configuration of the shelf including the front flange adds stiffness and provides a good weld joint, the shelf side flanges restraining batteries in a side to side direction.

Figure 10:
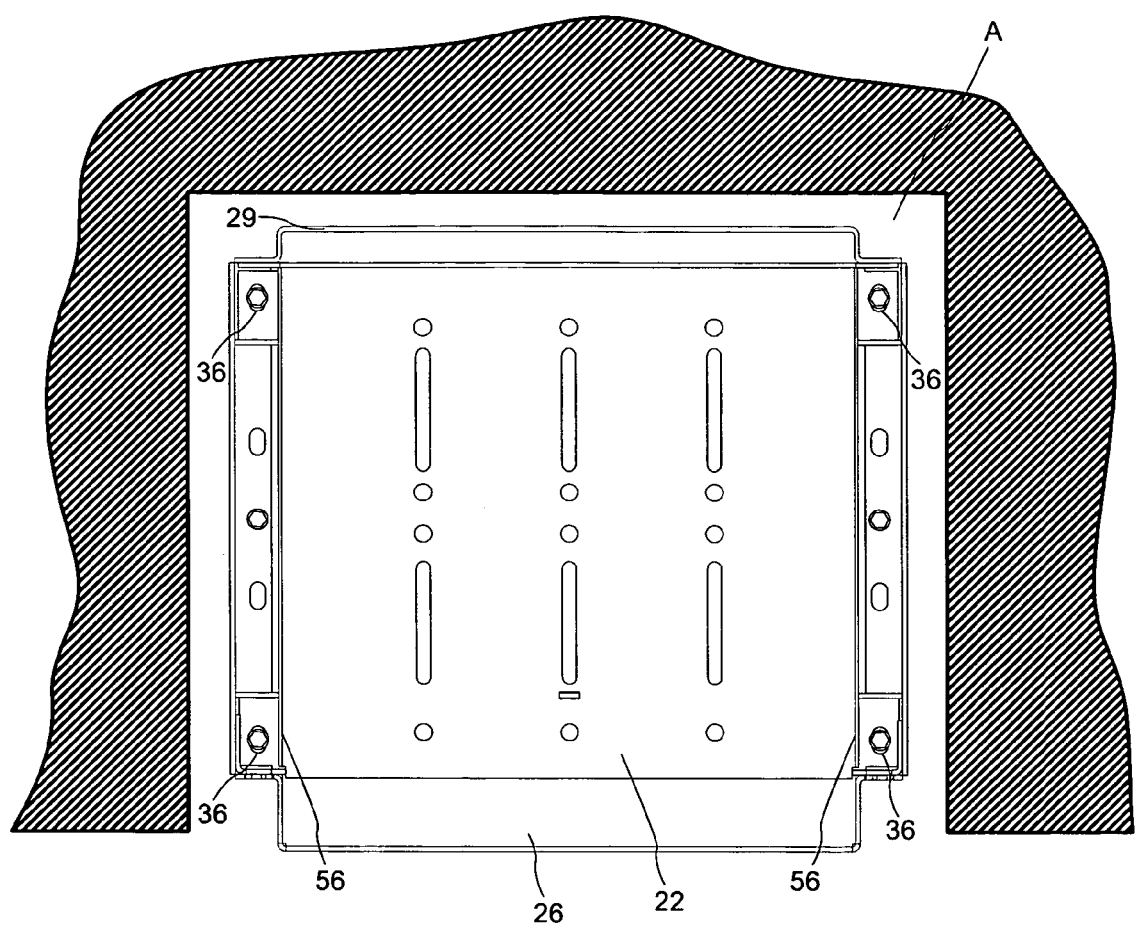
FIG. 10 is a top plan view showing the tray system of the present invention mounted from the front in a confined space.

Consider now assembly of the components comprising the modular tray system of the present invention and the installation of a multi-tier battery tray system in a relatively small confined alcove A as shown in FIG. 10. The modules M described above may be manufactured and preassembled or assembled and formed into a multi-tier tray systems at the site.

Considering first assembly of the components, the J shaped rear panel 20 is positioned between side panels 10 overlying the rear connecting flanges 18 so that the various holes in the rear panel 20 align and register with the complementary holes in the rear and bottom flange as shown in FIG. 14. The parts are welded at preselected, predetermined locations. As noted above, the side panels are identical and interchangeable simplifying manufacture and assembly. The rear J-shaped panel 20 ties the side panels 10 together and as noted hereafter J portion provides a U shaped channel section supporting the shelf 22. Nesting of the side edges of the rear panel in confronting overlying relationship to the rear connecting flange 18 of the side panel 10 provides a double thickness creating a vertical column for structural stiffness at the rear corners of the module M. Further the slotted holes 51 in the J portion of the rear panel 20 overlap and register with the anchor holes 36 in the bottom flange 14 of the side panels to create double material thickness for anchor loads.

Figure 15:
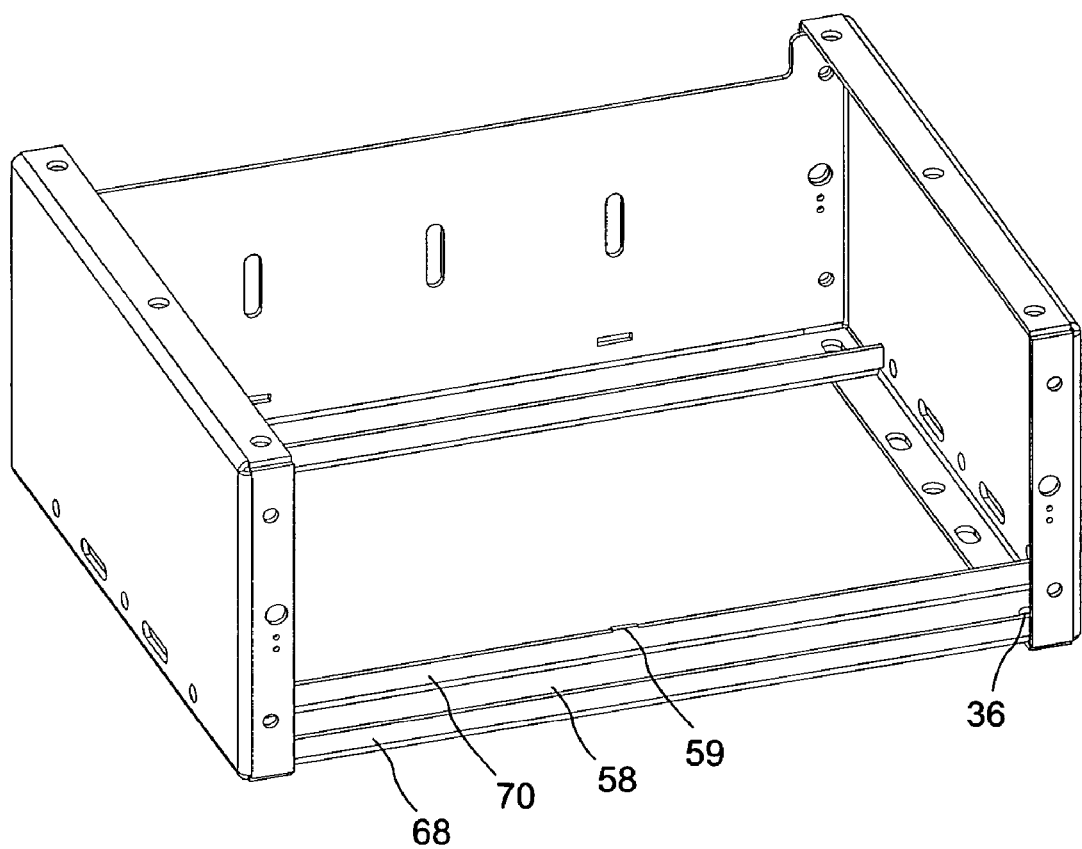
FIG. 15 is a perspective view similar to FIG. 14 showing the front connecting channel which also supports the bottom shelf for the batteries.
Figure 16:
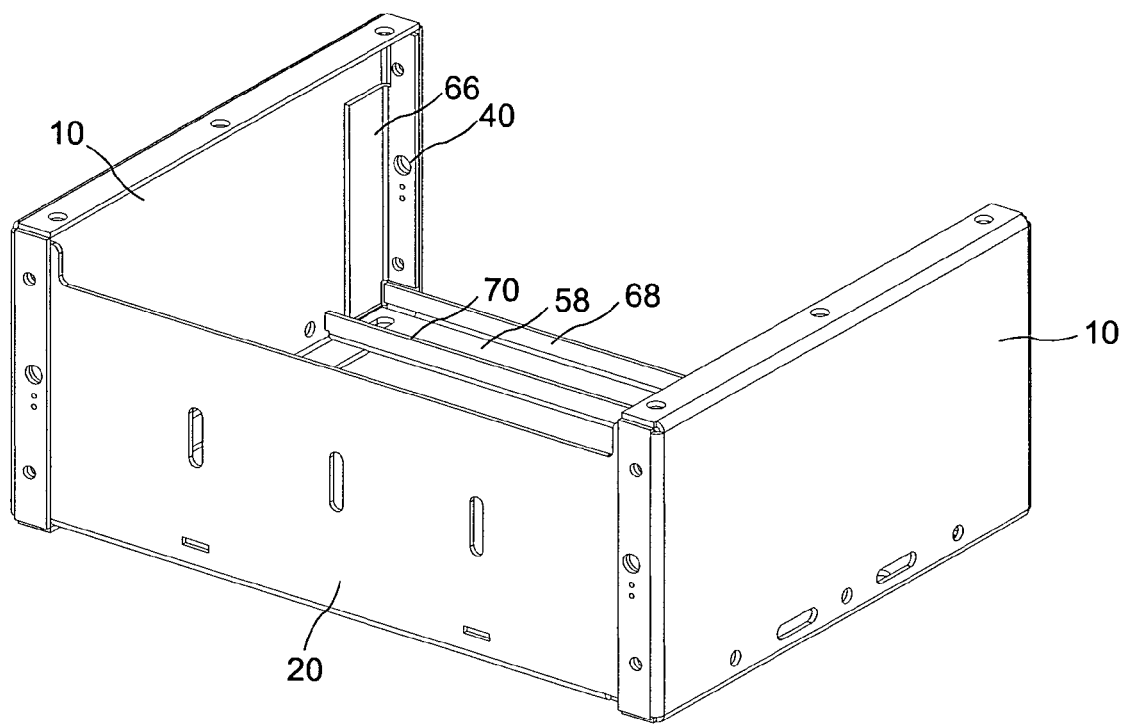
FIG. 16 is a perspective view similar to FIG. 15 as viewed from the rear panel showing the front corner stiffener.
Figure 17:
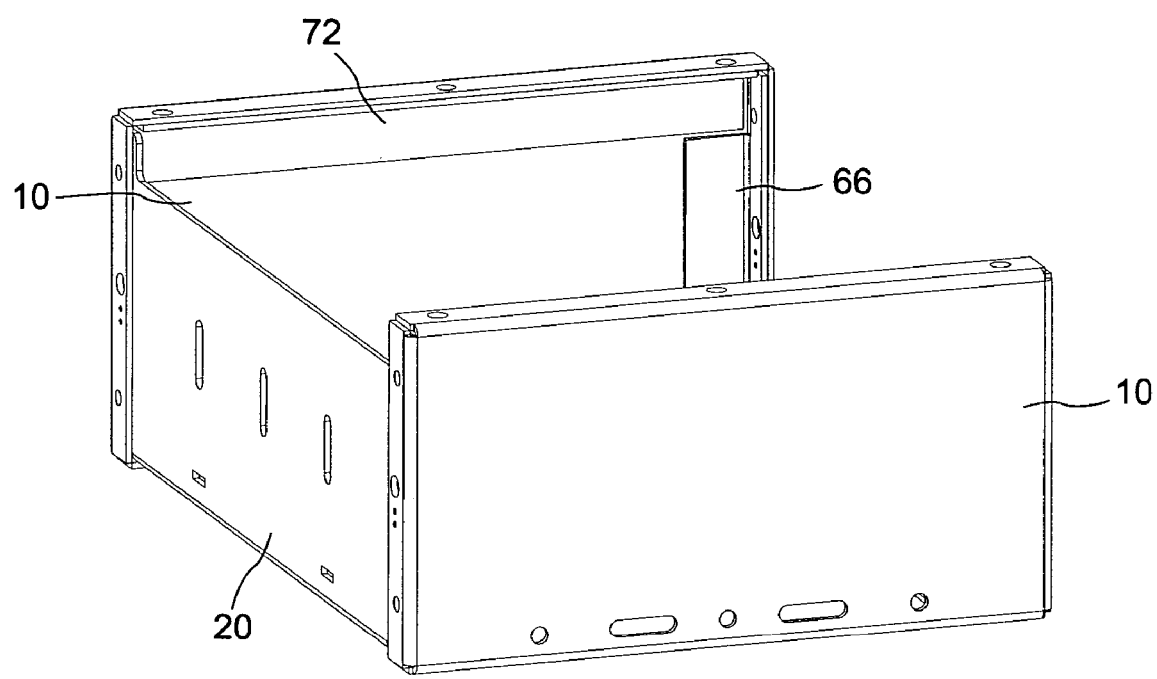
FIG. 17 is a perspective view as viewed from one of the side panel showing the upper corner stiffener.
Figure 18:
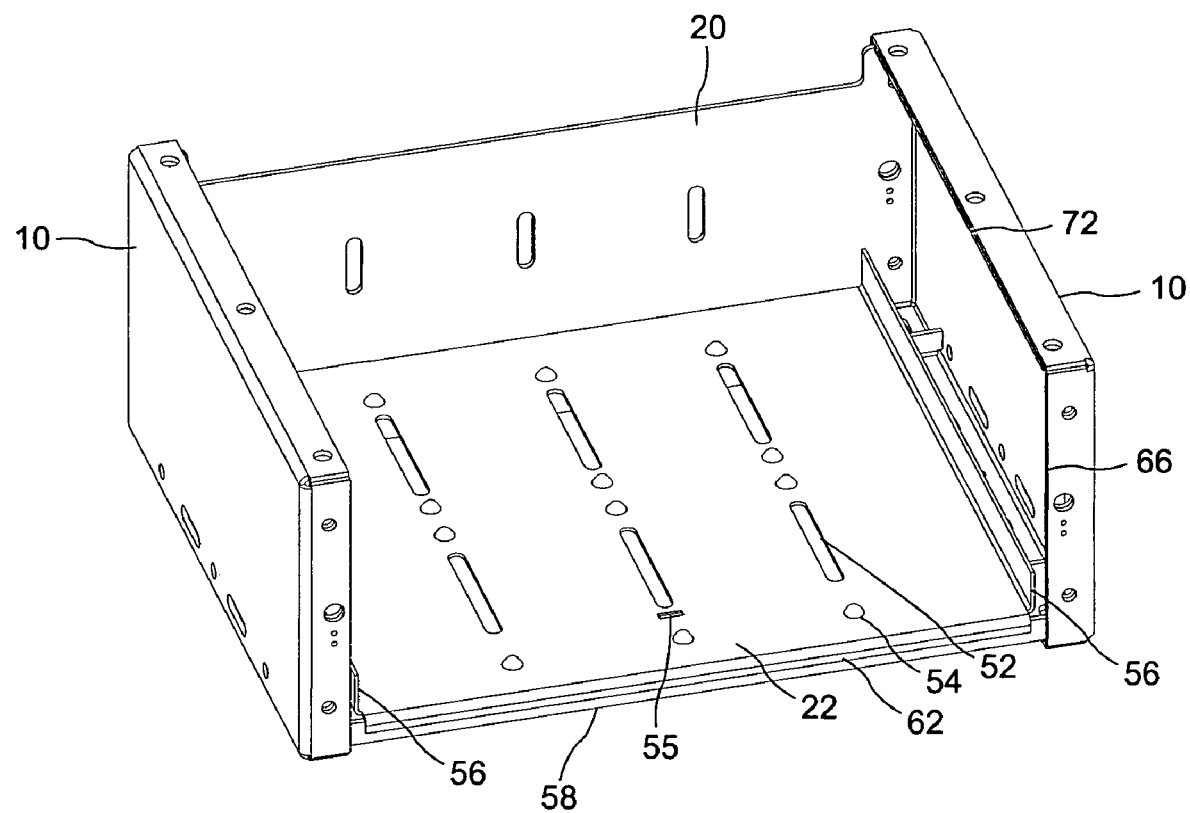
FIG. 18 is a perspective view of the tray with the battery shelf installed.

The next step in the assembly process is the positioning and welding of the front U-shaped support channel 58 and welding it in place as shown in FIG. 15. The front corner stiffeners 66 are then positioned in place with the various holes aligned with and in registry with holes in the front connecting flanges 16. The corner stiffener 66 is then welded at preselected locations as shown in FIG. 16. The front corner stiffener 66 create vertical columns for good structural stiffness of the entire module.

The shelf 22 is then positioned in place whereby the tabs 60 in the rear edge of the shelf 22 register and engage in slotted openings 50 in the rear panel 20. In this position, the depending front lip 62 of the shelf embraces and overlies the front U shaped cross channel 58 and the tab 59 engages through slot 55. The shelf 22 is then secured in place by welding at predetermined, preselected suitable locations.

Figure 7:
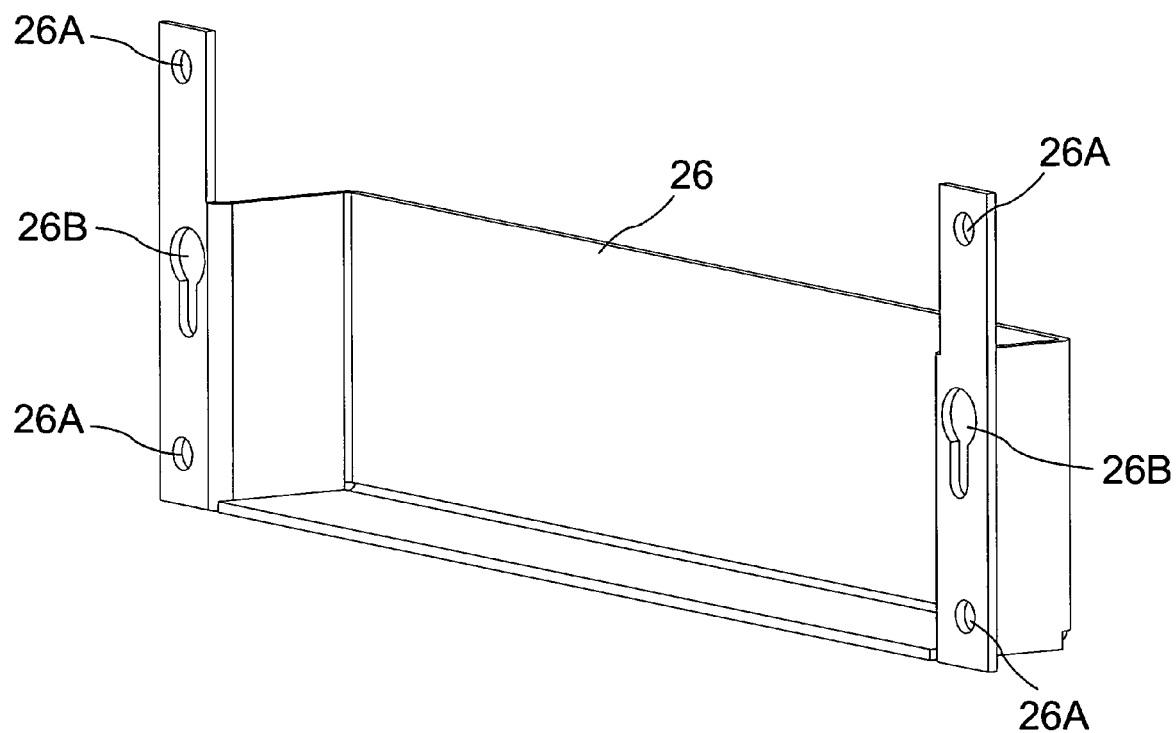
FIG. 7 is a perspective view of the battery retainer which mounts on the open front of the tray in the manner shown in FIGS. 1 and 2.
Figure 7A:
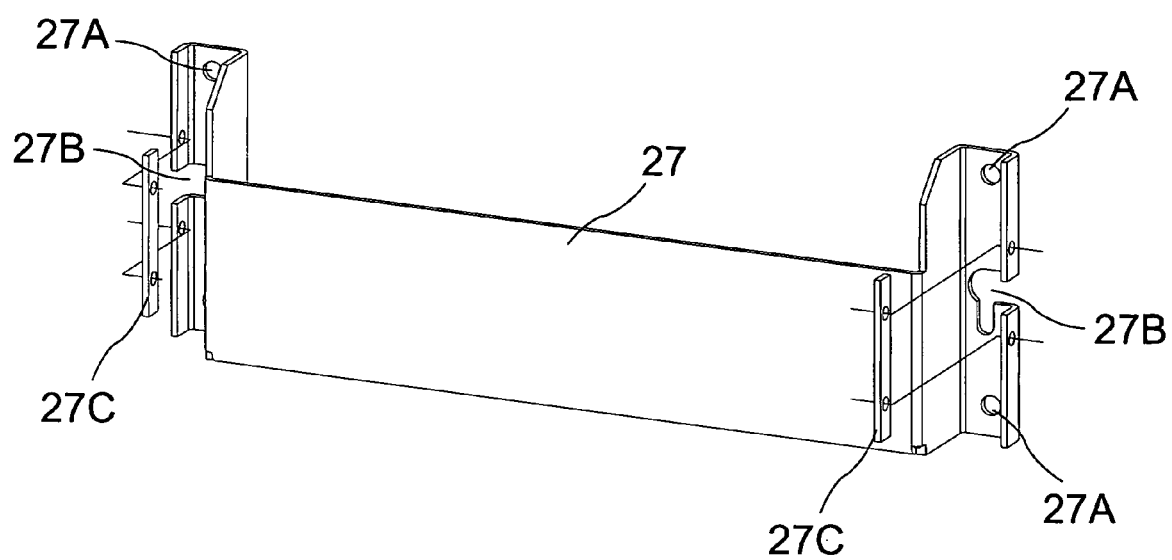
FIG. 7a is a perspective view of an alternate embodiment of battery retainer which mounts on the open front of the tray in the manner shown in FIG. 22.
Figure 8:
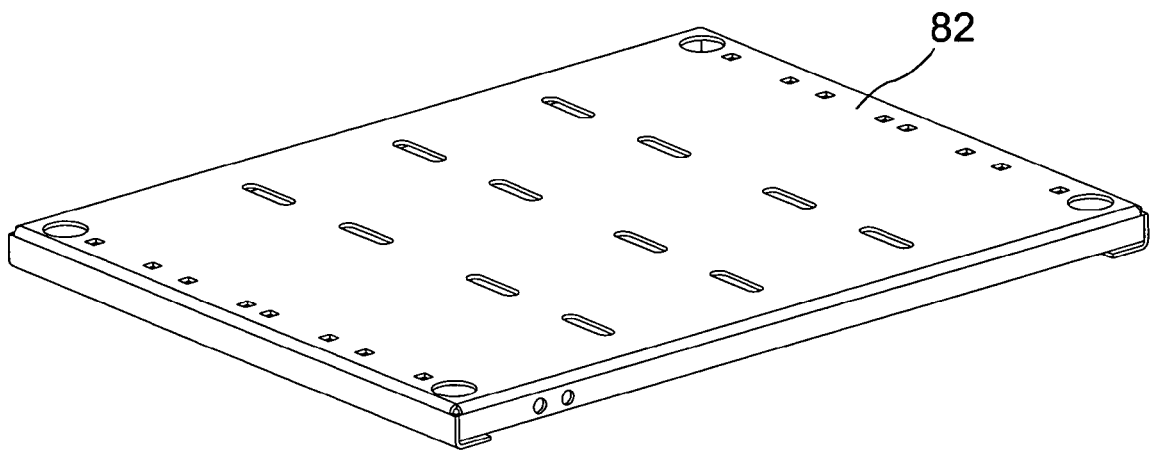
FIG. 8 is a top and bottom plan view of the cover.
Figure 8:
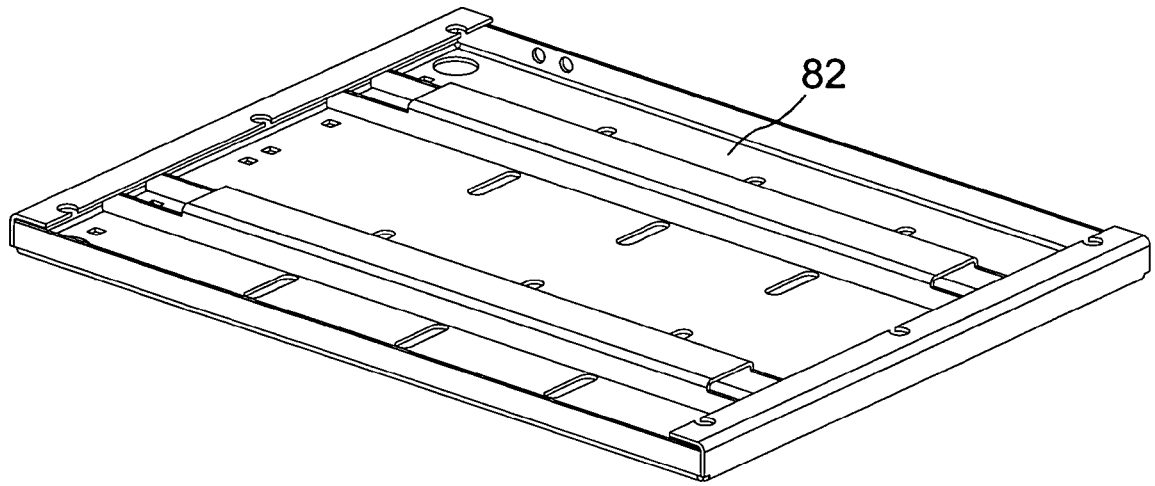
Figure 9:
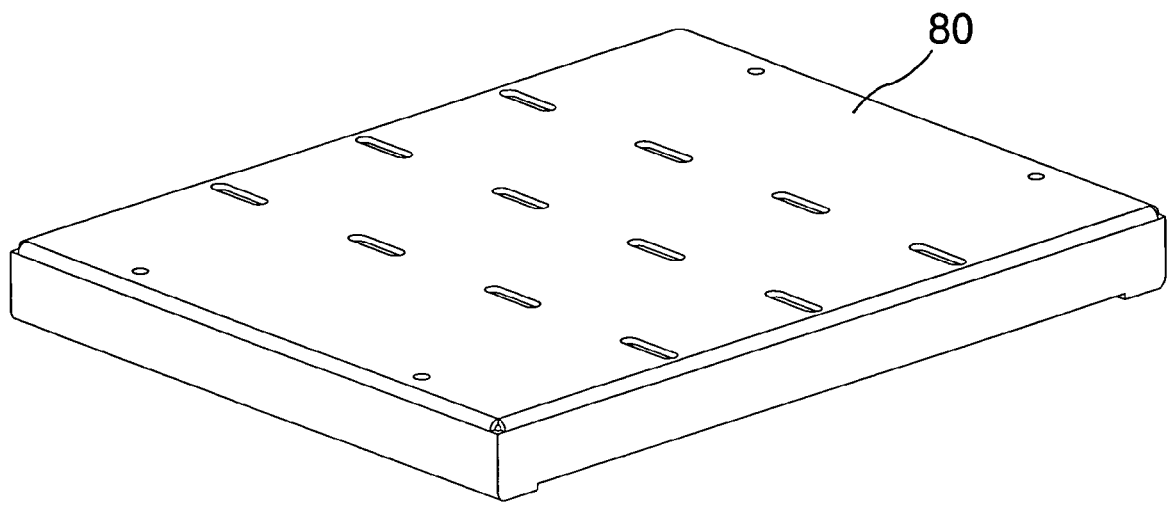
FIG. 9 is the top and bottom view of a modified cover for supporting an electronic relay rack.
Figure 9:
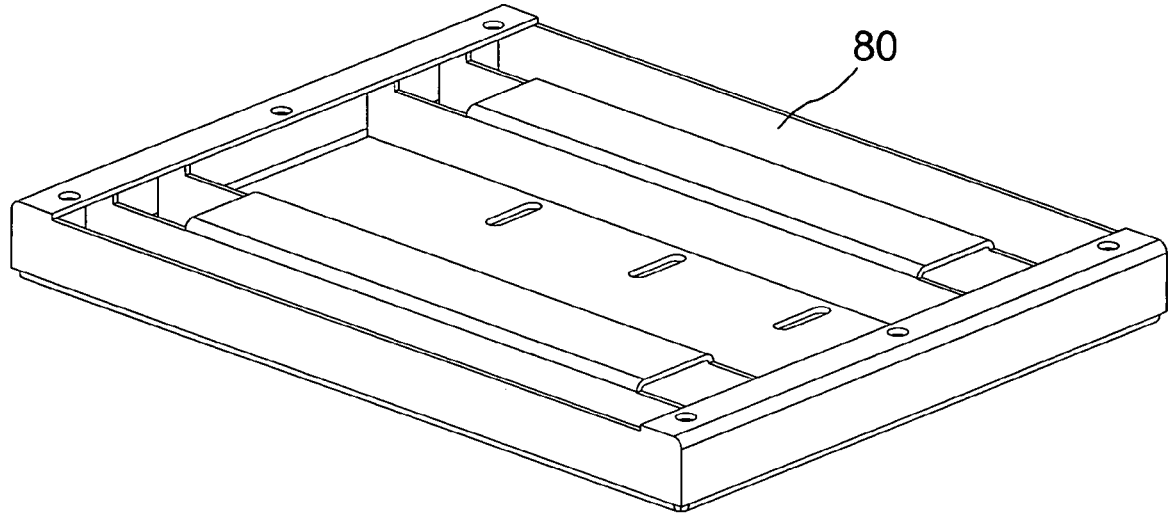
Figure 21:
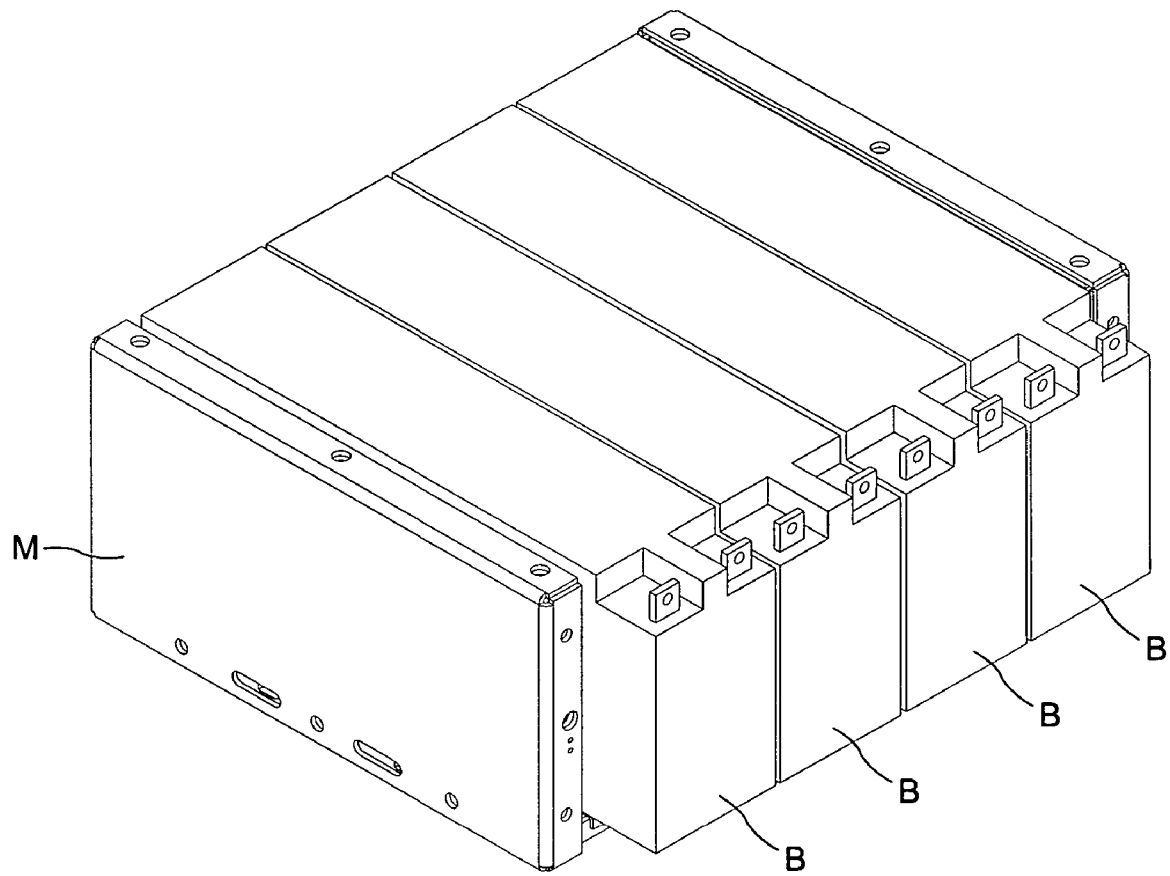
FIG. 21 is a perspective view of the full compliment of batteries mounted in the tray.
Figure 22:
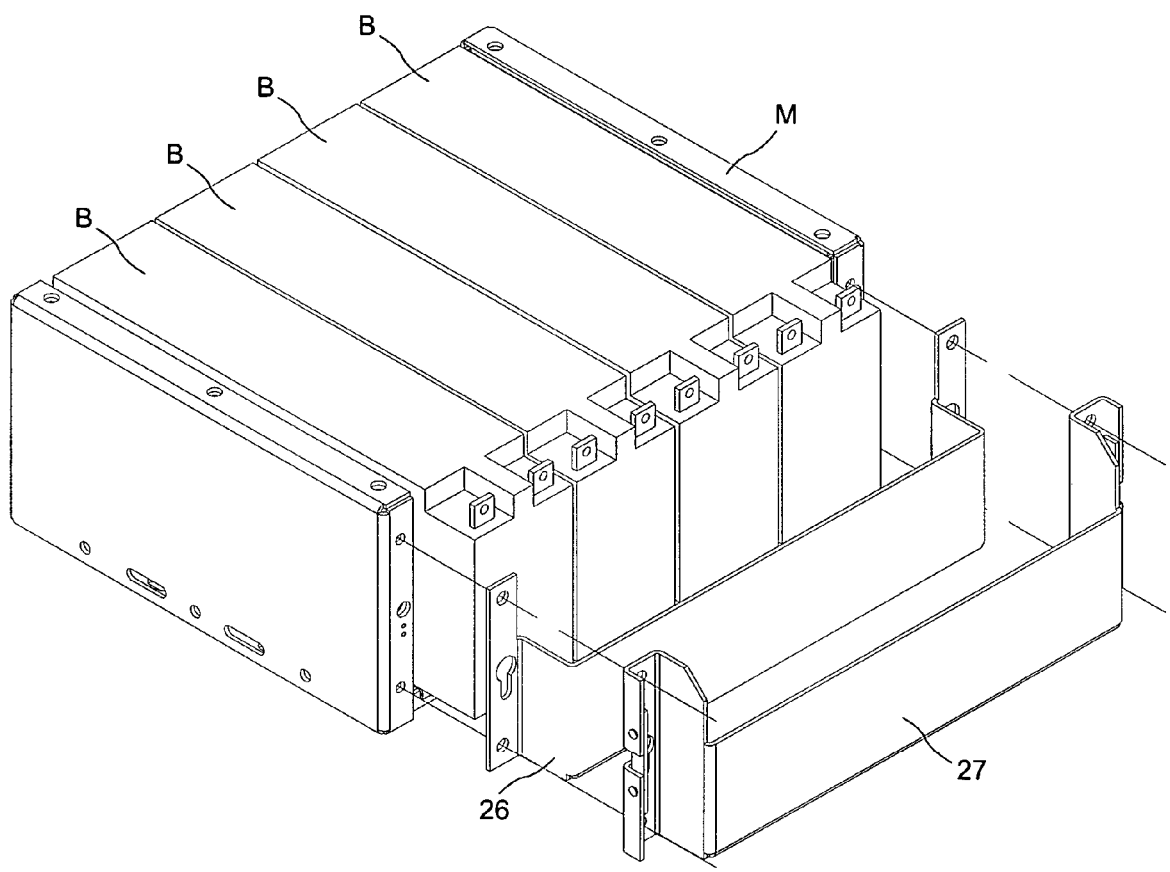
FIG. 22 is a perspective view showing the mounting configuration of the battery retainers.

The module M can now simply be positioned in the alcove A and secured to the floor by suitable bolts as shown in FIG. 10. These bolts as illustrated are easy to insert and secure from the front of the module. A multi-tier system can be created by simply positioning another module on top of the first module whereby the bottom flange of the second module confronts and engages the top flange 12 of the underlying module M. In this position, the bolt holes and the confronting flanges register and are aligned and securing of the two modules together is easily accomplished simply by tightening the locking bolts in place. The only access needed is through the front of the module M. After completion of a module system such as the three-tier module of FIG. 1 or the eight-tier system of FIG. 2, the top panel 80, 82 are bolted in place and thereafter the batteries are slid into the open front end of the modules so that the terminal portion of the batteries B protrude from the open front end of the modules in the manner shown in FIG. 21. The battery cables which have been prethreaded through the channel are then connected to the batteries. Thereafter the retainer 26, 27 is locked in place in the manner shown in FIG. 11. As shown in FIG. 7, the side flanges of the retainer 26 have upper and lower bolt holes 26a matching and registering with bolt holes 5 in the front connecting flange 16 of the side panel and a key hole slot 26b registering with the center channel hole 40 in the front connecting flange. The key hole slot 26b provides a clearance for the channel screws 45. In a modified embodiment shown in FIG. 7a, reference numeral 27, the key hole slot 27b extends out to the edge of the retainer side flange to facilitate removal of the retainer without disconnecting the cables C. A flat tie-bar 27c is bolted across the open slot to maintain retainer rigidity.

Even though particular embodiments of the present invention have been illustrated and described herein, it is not intended to limit the invention and changes and modifications may be made therein within the scope of the following claims.

What is claimed is:

1. A front access battery module for supporting batteries during seismic stress, comprising a pair of spaced side panels, a rear panel spanning the side panels and connected thereto at opposing side edges, a shelf forming a base for supporting batteries said self being of generally rectangular configuration having spaced tabs projecting from its rear edge which engage in slotted openings in the rear panel and including a front depending lip which overlies a front cross channel extending between the side panels adjacent the front access opening providing more stable support for batteries during a seismic event and means for securing the module to a support structure and fastening means for securing modules together to form a multi-tier battery rack system wherein the anchoring means and connecting means are accessible from the open front access end of the module.

2. A front access battery module as claimed in claim 1 wherein slotted holes are provided in the bottom flange of the side panels adjacent the front access opening so that anchor bolts extending through the overlapping portions of the front cross channel and lower flange of the side panel creates a greater material thickness for withstanding anchor loads.

3. A front access battery module as claimed in claim 1 wherein the rear panel is of a J-shaped cross section wherein the J portion provides a support for the shelf and the outer terminal side edges of the rear panel nest and overly confronting rear flanges of the side panels which function as rear corner stiffeners creating a vertical column for structural strength.

4. A front access battery module as claimed in claim 1 including an angle stiffener nesting in the front corners of the side panels to create vertical front columns at the corners for greater structural stability and stiffness.

5. A front access battery module as claimed in claim 1 wherein slotted holes are provided in the J portion of the rear panel which align with anchor holes in the bottom flange of the side panels so that anchor bolts extending through the overlapping portions create a greater material thickness for withstanding anchor loads.

6. A front access battery module as claimed in claim 1 wherein each side panel has upper and lower projecting flanges and side flanges connecting the upper and lower flanges and wherein the flanges are provided with spaced holes which register and provide means for mounting the modules one on top of another so that the flanges connected create a greater material thickness to withstand forces on the module system generated during a seismic event.

* * * * *